Nov. 30, 1954  A. STARTS  2,695,602
INTERNAL-COMBUSTION ENGINE
Filed Jan. 4, 1951  5 Sheets-Sheet 3

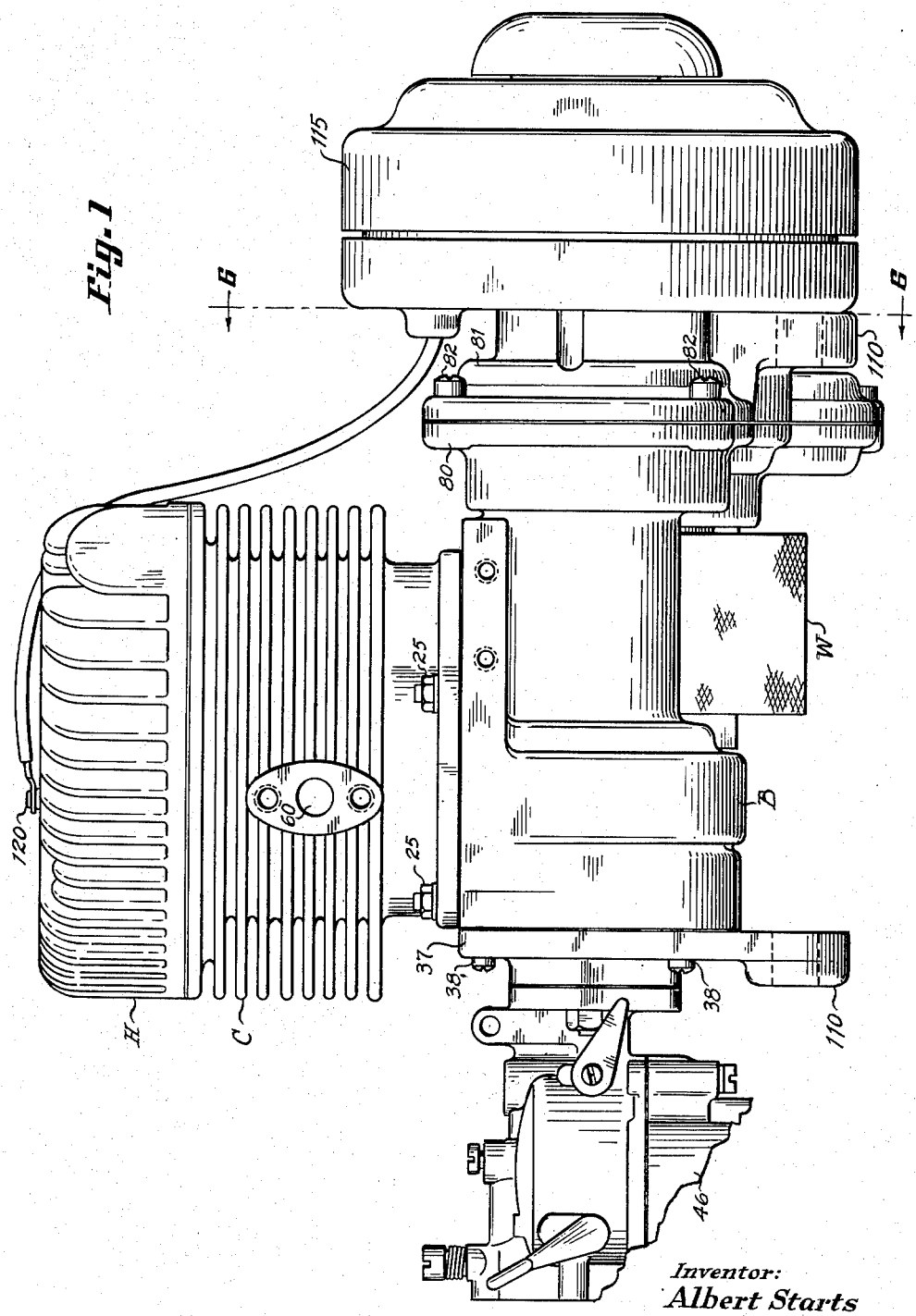

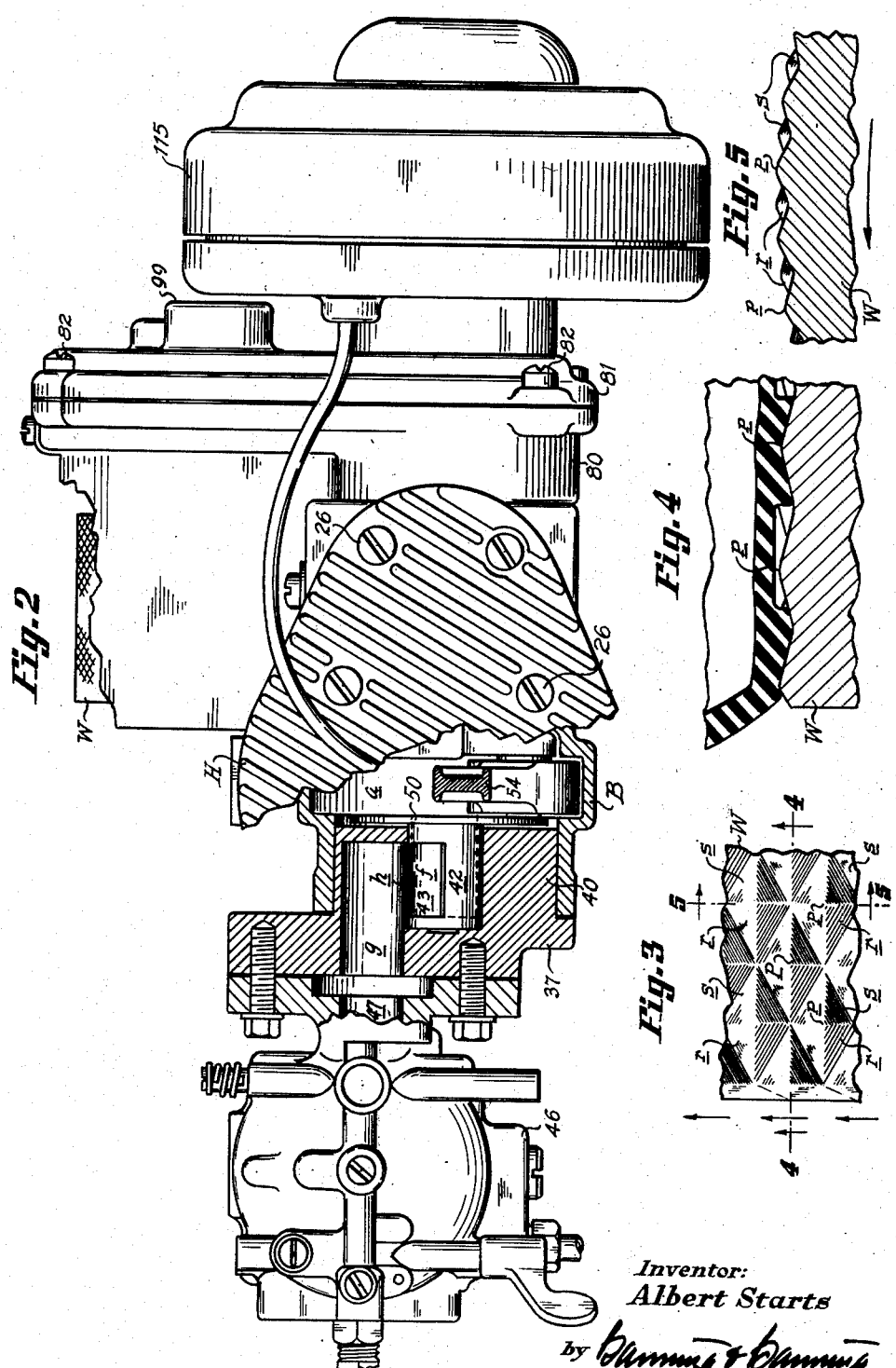

Inventor: *Albert Starts*
by *Dunning & Dunning*
Attorneys

Nov. 30, 1954     A. STARTS     2,695,602
INTERNAL-COMBUSTION ENGINE
Filed Jan. 4, 1951     5 Sheets-Sheet 4
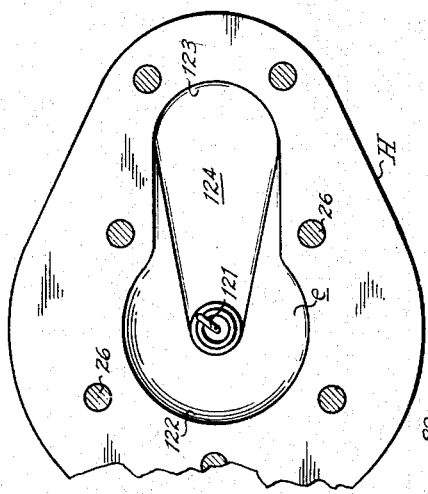
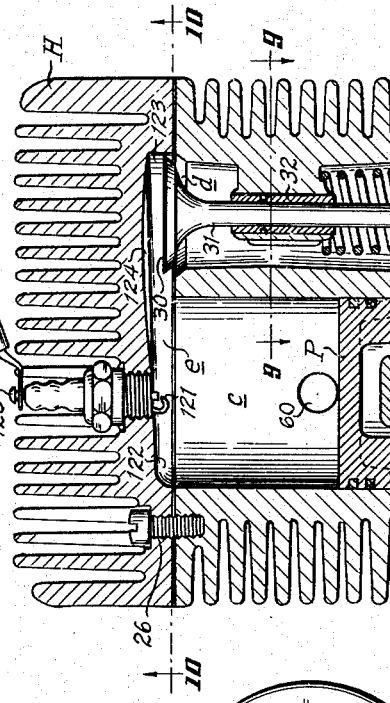
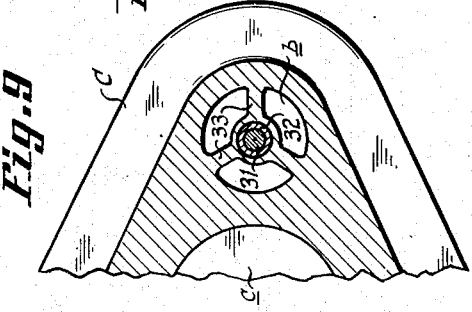
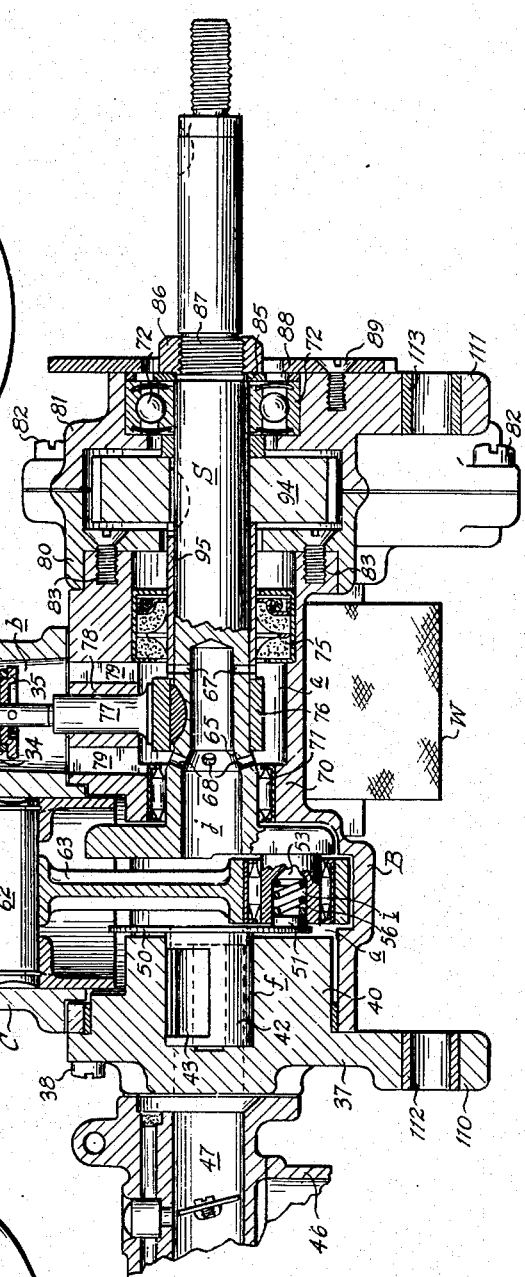
*Inventor:* Albert Starts
by *Attorneys*

Nov. 30, 1954     A. STARTS     2,695,602
INTERNAL-COMBUSTION ENGINE
Filed Jan. 4, 1951     5 Sheets-Sheet 5
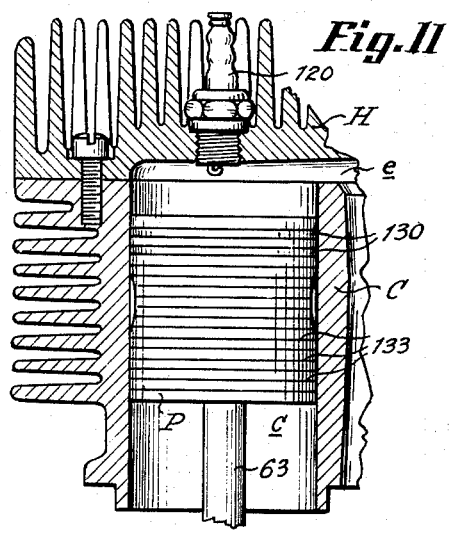
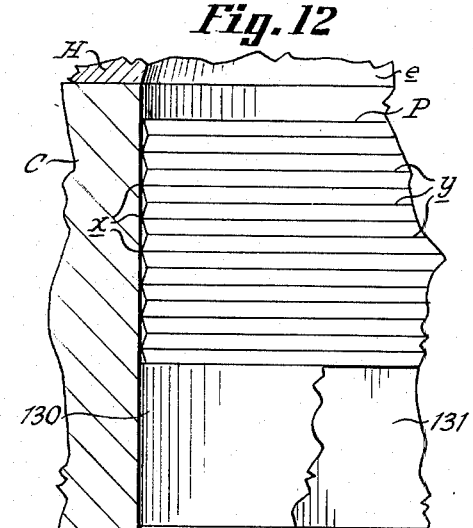
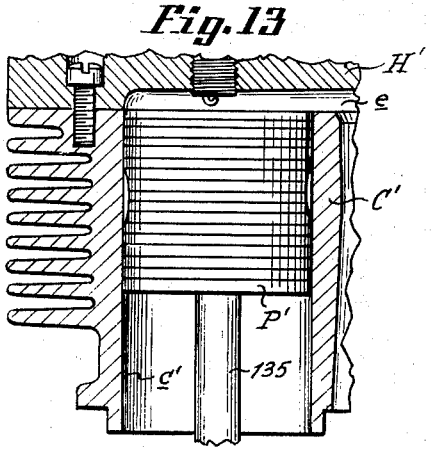
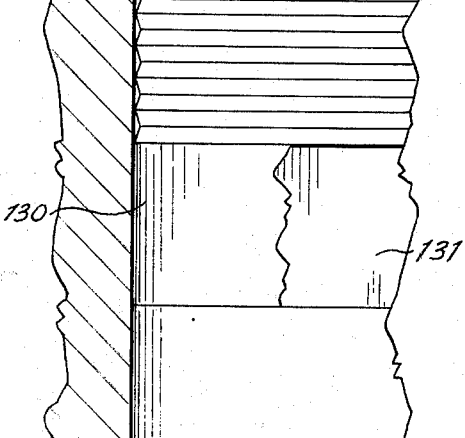
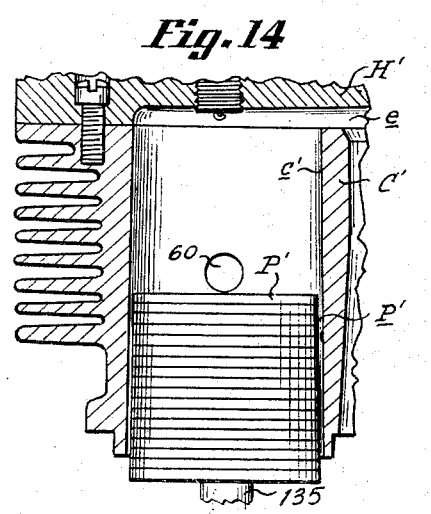
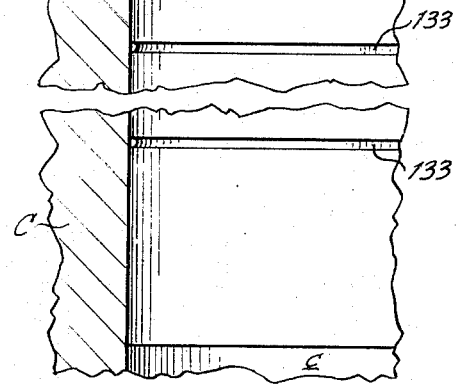
Inventor: Albert Starts

United States Patent Office 2,695,602
Patented Nov. 30, 1954

2,695,602

INTERNAL-COMBUSTION ENGINE

Albert Starts, Fort Lauderdale, Fla.

Application January 4, 1951, Serial No. 204,294

8 Claims. (Cl. 123—191)

This invention relates broadly to internal combustion engines. As herein illustrated, it is of the two-stroke cycle type, and the present improvements are applicable particularly to that type of engine. The various features of improvement which characterize my present invention may be incorporated, most or all of them, into a single engine structure as herein disclosed, and when so combined they cooperate effectively in producing certain special and unusual results; their conjoint use, however, is not necessary in all cases so that each feature of improvement should be considered as a possibly separate invention where the circumstances so justify or require.

Among the primary objects of this invention is an internal combustion engine of the two-cycle type wherein: (a) the flame resulting from combustion of the fuel will advance into every point of the combustion chamber at one and the same moment, with ignition originating close to the axial center of the chamber whereby to obviate any secondary explosion; (b) there is admixed with each fresh explosive charge a predetermined amount of carbon dioxide whereby to slow the burning process and lower the flame temperature in the combustion chamber and permit use of a higher compression ratio without detonation; (c) a substantially complete combustion takes place to produce the carbon dioxide used for admixture with each fresh explosive charge, the presence of flame passing out with the exhaust being thereby eliminated as well as back-firing at any stage of the operating cycle; and (d) effective use is made of a high tension ignition spark plug with assurance of long life due to maintenance of relatively cool conditions in the combustion chamber in the area immediately surrounding the plug.

Other primary objects of this invention are the provision of (a) spaced lands on the piston having relatively high and low points, the former being slightly in excess of the remainder of the piston and engaging the cylinder walls rather tightly so that, when initially fitted therein and operated, the high points will wear down to the exact size and shape of the cylinder walls to maintain a 100% physical contact therewith with capacity to move freely relative thereto, thereby preventing escape of compressive forces along the sides of the piston; (b) a ringless piston that is very slightly tapered endwise to a smaller diameter at its upper end for coacting with a cylinder whose internal wall surfaces are similarly tapered, the arrangement being such that when the piston is at the end of its stroke which places it closest to the cylinder head, the coacting tapered surfaces will have advanced into physical contact throughout substantially 100% of their areas, both axially and circumferentially, i. e., to a plug fit, thereby requiring the entire force of the explosion to be concentrated on the top of the piston without any opportunity of escape; (c) a simplified power transmission within the engine base, having a driving connection with a friction wheel whose axis parallels that of the crank shaft, the wheel being positioned medially of the ends of the engine and having a mounting at one end of a shaft requiring for its support but one bearing additional to that which is provided for the crank shaft itself; and (d) a tread contour for the engine friction wheel such that, when operatively engaged with the tread of a driven wheel to transmit power thereto, the slip therebetween will be negligible regardless of other conditions present, such as temperatures, moisture, etc.

These and other objects of my invention as will hereinafter appear from the ensuing description may be attained when embodied in an engine construction as illustrated in the accompanying drawings wherein—

Figure 1 is a side elevation of the engine, including its fly-wheel magneto and the gear-driven, power-transmitting friction-wheel;

Fig. 2 is a top plan view of the engine, a portion of the cylinder being broken away to exhibit in section the crank shaft and fuel-metering valve operated thereby;

Fig. 3 is an enlarged fragmentary detail of the friction wheel tread;

Fig. 4 is a fragmentary radial section, taken on line 4—4 of Fig. 3, showing the friction wheel in operative engagement with the tread of a resilient tire carried by a wheel that is to be propelled thereby;

Fig. 5 is a fragmentary detail in section, taken transversely of the friction wheel axis on line 5—5 of Fig. 3, showing another view of its tread;

Fig. 8 is a longitudinal section through the engine, taken on line 8—8 of Fig. 6;

Fig. 9 is a fragmentary detail, taken on line 9—9 of Fig. 8;

Fig. 10 is a view in section, taken on line 10—10 of Fig. 8, showing in elevation the axial combustion chamber recess that is provided in the cylinder head;

Figure 6:
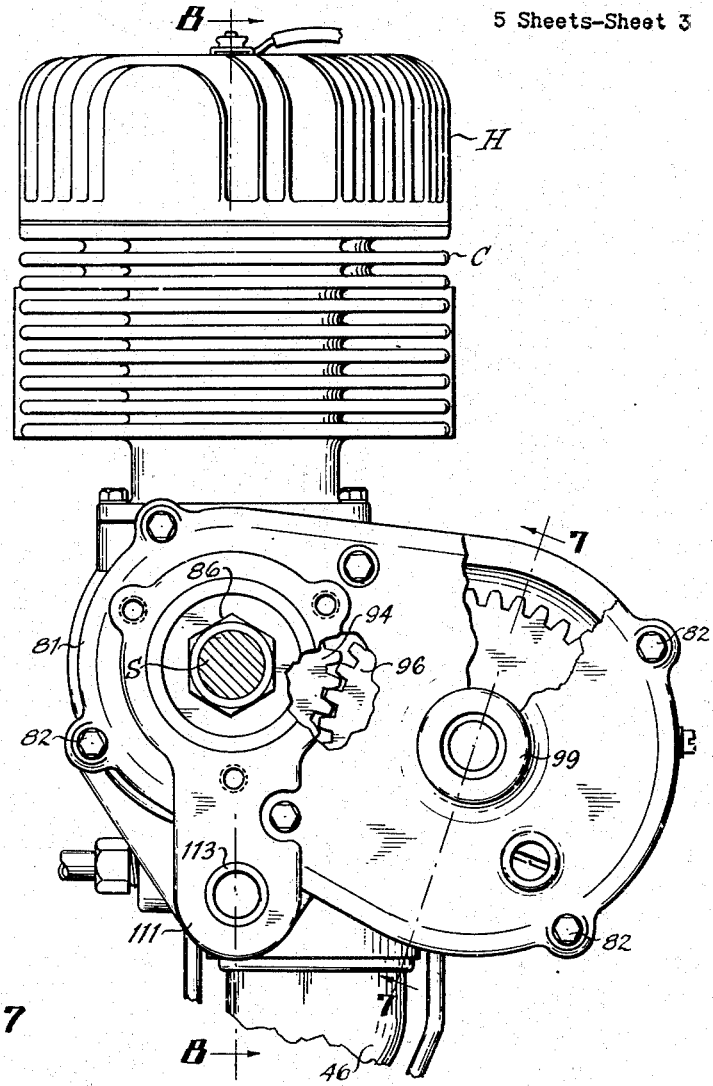
Fig. 6 is a vertical section transversely of the engine shaft, taken on line 6—6 of Fig. 1.

Fig. 11 is a view in elevation of the engine piston within its coacting cylinder (shown in section), the piston being characterized by a plurality of circumferential lands and grooves which are illustrated on a greatly enlarged scale in Fig. 12 which is a fragmentary diagrammatic view, exaggerated in its proportions, showing the piston lands and grooves in their operative relation to the wall of the associated cylinder;

Fig. 13 is a vertical section through a cylinder-piston assembly of modified construction wherein the engaging surfaces of both the piston and cylinder are similarly tapered to a slightly smaller diameter toward the cylinder head, the piston being shown in its top position adjacent the head; and Fig. 14 is a similar view in which the piston is illustrated in its extreme opposite position.

The engine herein to be disclosed as an exemplification of my invention is air cooled, of fractional horsepower, made of duraluminum or other light metal with a total weight of perhaps less than 7 lbs. and designed particularly for application to a bicycle which it drives by means of a friction wheel which is arranged to engage the tread of the pneumatic tire of one of the two wheels of the bicycle, the engine being pivotally mounted so as to have capacity for rocking movement to advance its friction wheel toward or away from the tire tread, so as to engage therewith or disengage therefrom. The details of this mounting form no part of the present invention, so that the ensuing description will be confined to the engine per se.

Referring first to Figs. 1 and 8, the engine embodies a base B forming a compression chamber $a$ comprising a crank case opening at one end upon a coaxial cam case of lesser diameter. Mounted on the base B is a cylinder C conventionally secured in place as by bolts 25, and open at its top end where a surmounting closure head H is affixed thereto by bolts 26. The contour of the head corresponds with that of the cylinder which is laterally elongated to accommodate a fuel passageway $b$ to one side of its combustion chamber $c$ and in separated relation thereto. A port $d$ having a beveled periphery forming a seat provides communication between the fuel passageway $b$ and a shallow recess $e$ on the inner face of the head H extending laterally to form a passageway between the port $d$ and the combustion chamber $c$. An intake valve of the poppet type having a head 30 rests on the seat of the port $d$ to normally shut off communication therethrough. This valve comprises a stem 31 which is reciprocably supported in a guide 32 carried by radial webs 33 centrally of the fuel passageway $b$. This chamber tapers slightly from opposite ends to a point of minimum diameter opposite the webs for a purpose that will later appear. As by means of a spring 34 which exerts opposing thrusts on the lower ends of the webs 33 and upon a washer 35 that is pinned therebelow to the stem 31, the intake valve is normally maintained in closed position upon its seat.

The crank case at one end of the compression chamber $a$ is open endwise to receive a closure cap 37 which is secured to the base B as by bolts 38. A cylindrical body 40 formed on the cap is extended inwardly therefrom to lie within the crank case, and within the body are two cylindrical chambers $f$ and $g$, arranged side by side, with an intervening port $h$ establishing the only means of communication therebetween (see Fig. 2). The chamber $f$ which is coaxial with the crank case is open at its end that is proximate thereto, whereas the chamber $g$ is open at the opposite end upon the outer face of the closure cap 37. A metering device in the form of a rotatable sleeve valve 42, closed at one end, is rotatably positioned within the chamber $f$ and provided with a side opening 43 adapted, when in cyclic positions extending through an arc of approximately 150°, to register with the port $h$ so as to establish communication with the chamber $g$.

Secured to the outer face of the cap 37 is a carburetor 46 or other suitable mixing device for a volatile hydrocarbon fuel. The gaseous mixture leaves the carburetor through a valved outlet 47 which registers with the open outer end of the chamber $g$ so as to deliver combustible fuel thereinto. By means shortly to be described, a transfer is made of this combustible fuel to the sleeve valve 42 which delivers it in a predetermined amount into the chamber $a$ for compression and eduction (by means shortly to be described) to the fuel passageway $b$ where it is held briefly awaiting its release into the combustion chamber $c$ of the engine cylinder.

The end of the sleeve valve which faces the crank case is open and provided with a laterally extending flange 50 in the form of a disc which carries near its outer periphery a short pin 51 that is adapted to enter the proximate end of a cylindrical pocket $i$ formed in a hollow pin 53 that is carried near the outer end of a crank arm 54 affixed to one end of the engine shaft S (see Fig. 8). A coiled spring 56 within the pocket $i$ exerts a thrust pressure against the pin 51 tending to hold the disc 50 against the proximate face of the cap 37 (or a gasket thereupon) thereby assuring retention of the sleeve valve in a fixed axial position within the chamber $f$. The disc 50 is centrally apertured so that combustible fuel within the sleeve valve 42 will be free to escape therefrom into the crank case.

Within the cylinder C is reciprocably fitted a piston P which, in one extreme position (see Fig. 8), uncovers an exhaust port (or ports) 60 extending through the walls of the cylinder. This piston is flat on its end which faces the cylinder head H, and oppositely thereof is skirted to support between its opposite sides a wrist pin 62 to which is joined one end of a connecting rod 63 whose opposite end is joined to the crank pin 53. By the means described, the crank shaft S will be rotated in response to successive cyclic strokes of the piston P within the cylinder C, and in so doing the crank arm 54 will operate the sleeve valve 42 alternately to receive and release successive charges of gaseous fuel which upon entering the base chamber $a$ are compressed therein as the piston moves toward the base B.

The diameter of the shaft S is enlarged slightly in the region adjacent the crank arm 54, and is then beveled at 65 through a short distance beyond which it continues with a lesser diameter. An axial chamber $j$ which is formed within the enlarged end portion of the shaft is open at its crank arm end. This chamber is tapered inwardly, oppositely of the beveled portion 65, the chamber then continuing axially of the shaft for a limited distance to communicate with radial ports 67 near its inner end. A plurality of ports 68 are also provided through the walls of the shaft oppositely of its beveled portion 65.

The walls of the base B extend inwardly to form a circular wall 70 which provides a partial crosswise division of the base chamber $a$ to define crank and cam cases in adjacent relation. Resting upon the circular wall is an antifriction bearing unit 71 for supporting the shaft S rotatively at its point of maximum diameter. Another antifriction bearing unit 72 also supports the shaft S rotatively at a point which is further removed from the crank arm. The cam case is sealed at one end by a packing unit 75 which prevents leakage of gaseous fuel at that point. Mounted fast on the shaft S within the cam case is a cam 76 in engagement with the inner end of a cam follower 77 that is fitted to the proximate end of the intake valve stem 31 whereby to operate the same. This follower is reciprocably supported within a radial opening 78 in a wall of the base B so as to be guided thereby. Extending between the cam case and the fuel passageway $b$ are elongated ports 79, about opposite the ports 67 and 68, through which gaseous fuel leaves the shaft chamber $j$. Inasmuch as this fuel is subjected to compression before advancing into the fuel passageway $b$, it moves rapidly and surely on its way so as to accumulate within the fuel passageway and be ready for release immediately upon the head 30 of the intake valve being lifted from the seat of the port $d$.

In emerging radially through the crank shaft ports 67 and 68, the gaseous fuel is accelerated in its movement by centrifugal action; it tends, in consequence, to cool and lubricate the adjacent cam 76. In its upward movement through the elongated fuel passageway $b$, the gaseous fuel is required to advance along walls which taper inwardly to a point of minimum diameter at the line 9—9. I thus provide Venturi characteristics in the fuel passageway $b$ which is further reduced in area by the presence of the webs 33 and guide supported centrally thereof. Movement of the gas through this portion of the passageway is, therefore, accelerated as it advances into the enlarged upper end portion thereof, immediately below the valve head 30. Here the vaporized fuel accumulates under pressure ready to escape through the port $d$ when the valve head 30 is lifted. The gas thus trapped moves rapidly through the port, when permitted to do so, without any existing velocity having been previously required. The amount of gas so accumulated is predetermined by the capacity of the rotary sleeve valve 42, and while detained momentarily within the fuel passageway $b$ it acts to cool and lubricate the intake valve and holds its temperature within safe limits.

The end of the base B opposite the closure cap 37 is open so that the shaft S may extend therethrough and outwardly therebeyond. To the open end of the base is secured a gear casing comprising inboard and outboard sections 80 and 81 interconnected as by bolts 82, the inboard section 80 being connected to the base by bolts 83. The antifriction bearing unit 72 which supports the shaft S is accommodated within a seat provided interiorly of the outboard section 81 where it is secured in place by a plate 85 with the aid of a nut 86 that is screwed onto a threaded portion 87 of the shaft. An outer covering plate 88 is also carried by the outboard section 81 to which it is secured as by screws 89, thereby assuring retention of the inner plate 85 in place.

Figure 7:
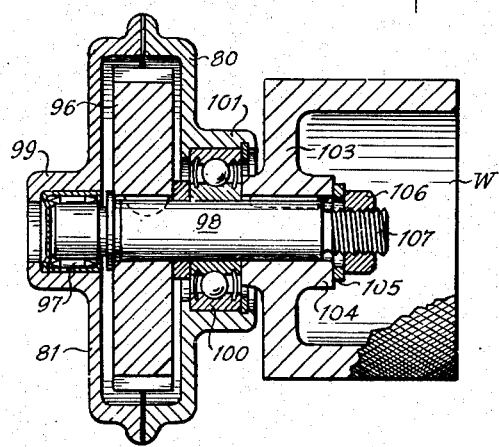
Fig. 7 is a detail in section, taken on line 7—7 of Fig. 6.

Mounted fast upon the shaft S within the chamber provided by the two casting sections 80 and 81 is a gear 94. A spacer sleeve 95 which surrounds the shaft S extends between this gear and the packing unit 75 and is maintained against rotation by any suitable means. The gear 94 is in mesh with a second gear 96 which is also accommodated within the same chamber in a lateral extension thereof (see Fig. 7). The gear 96 is mounted fast on a stub shaft 98 one end of which is supported rotatively in an antifriction bearing unit 97 that is mounted within a hollow boss 99 extended laterally from the outboard casing section 81. On the opposite side of the gear 96 a second antifriction bearing unit 100 is also provided for support thereof, this bearing unit being accommodated within a circular flange 101 that is extended laterally from the inboard casing section 80. The shaft 98 which is extended past the bearing unit 100 supports on its outer end portion a hollow friction wheel W open at one end and closed at its other end by a wall 103 which joins with a hub 104 that is secured fast to the shaft 98. As by means of a washer 105 and a nut 106 that is screwed onto threads 107 formed upon the shaft 98, the friction wheel W is retained securely in place.

Depending from the cap 37 is an ear 110 opposite a similar ear 111 which depends from the outboard casing section 81. Aligned openings in these ears are fitted with bushings 112 and 113, respectively, for reception of pivot pins (not shown) forming part of a mounting whereon the engine may be tiltably supported. Such a mounting may be advantageously used on a bicycle or other wheeled carrier which is to be powered by the engine herein disclosed. A magneto-flywheel 115 is carried by the shaft S outwardly of the bearing unit 72 and secured fixedly in place by any appropriate means.

A spark plug 120 is carried by the head axially of the cylinder, the ignition points 121 of the plug being projected into the shallow recess e of the head (see Fig. 8), whose peripheral walls 122 in one end portion are rounded and generally circular in contour to correspond with that of the combustion chamber c with which it is also concentric. The recess e is laterally extended through a narrower portion 123 toward the valve head 30 so as to provide thereabove a space which is circular through 180° or more for accommodation of the valve head when lifted. In addition, there is a shallow channel 124 extending in the recess e between the opening wherein the plug 120 is positioned and the remote end of the extension 123, this channel increasing gradually in width and having its roof slightly bowed both crosswise and endwise so that its maximum distance from the top of the cylinder is at a medial point.

The provision of such a head having an associated recess and intake valve, as specified, is advantageous in certain particulars. In passing the open intake valve head 30, the fuel encounters the curved wall at the end of the shallow concave channel 124 and is thereby deflected and caused to rebound toward the open larger end of the lateral recess e which surrounds the spark plug 120. In this movement the incoming gases acquire a whirling motion which produces turbulence that is beneficial to complete combustion. The channel 124 extends between these points to facilitate and direct movement of the fuel to the center of the combustion chamber c. The distance is short, and the ignition points of the plug are projected into the recess e at the top of the combustion chamber, coaxially thereof. The result is a ventilating and cooling of the plug which prolongs its serviceable life many times beyond that which is ordinarily realized with a construction where no such provision for cooling is made.

When the piston, during its downward movement reaches a point substantially 60° ahead of bottom dead center of the crank pin, the exhaust port (or ports) 60 will be uncovered thus causing a rapid fall of pressure in the combustion chamber c. When pressure in this chamber becomes slightly less than the pressure of the fuel mixture in the compression chamber a and passageways communicating therewith, the poppet valve 30 will be opened by the cam 76 which is rotatively positioned on the shaft S to effect such opening movement at about 40° before the bottom dead center of the crank pin 53. Opening of the valve at this juncture will release the compressed and expanded fuel charge and permit the flow thereof into the combustion chamber c. Introduction of a predetermined fixed amount of fuel into the compression chamber a tends to lower the temperature thereof and increase the expansion of the fuel, thus elevating the compressive ratio in the motor.

In an engine of the two-stroke cycle type a certain amount of the unburnt products of combustion will remain in the cylinder after the piston reaches bottom dead center of the crank pin. During upward stroke of the piston such exhaust gas or $CO_2$ as remains in the cylinder will be commingled with the fresh fuel introduced through the intake valve, thereby reducing the flame temperature in the combustion chamber c which, in turn, eliminates detonation. The rotative position of the cam 76 is to be determined with reference to the octane content of the fuel so as to effect retention of a larger amount of the burnt products of combustion within the cylinder. The longer the intake valve remains open, the greater will be the amount of $CO_2$, and vice versa. In the present engine the intake valve remains open through 90°–95° of the piston travel, this interval of time being determined according to various conditions present, including the design which is incorporated into the engine.

Referring now to Figs. 11 and 12, the piston of the present engine presents some special features of improvement. As herein shown, provision is made for use of two piston rings 130, each to be accommodated closely within a circumferential groove 131 that is provided for this purpose. These rings are located relatively close to the top of the piston and in spaced relation to each other. Below the lowermost ring, the piston is formed with a plurality of circumferential oil grooves 133 which extend at spaced intervals through substantially the full length of the piston below the area thereof which is occupied by the rings.

The circumferential areas of the piston between the two rings and above the topmost ring are specially formed and will be referred to as lands. I provide in each land a plurality of wide angle cuts extending circumferentially or spirally, and defining hills and valleys x and y, respectively, which present high and low points for a special purpose. The diameter at the high points is very slightly in excess of the low points on the piston, about .0013" being suggested. When the piston is first fitted in place, the high points on the lands, when heated, will engage rather tightly, and for substantially their entire area, with the walls of the cylinder. As operation proceeds, these high points start wearing down until their diameter conforms substantially with that of the cylinder. In this operation, oil that is trapped in the valley y will be wiped back and form over the engaged surface of the cylinder so as to furnish adequate lubrication. Freezing is thereby effectively avoided.

Wearing down of the high points of the lands takes place rapidly, requiring only a few minutes. When done, the lands will then be reduced in diameter at their high points sufficiently to move freely in the cylinder while still maintaining perfect concentricity and physical contact therewith continuously through 360°. This condition continues indefinitely, the clearance (if any) being slightly less than elsewhere between the piston and the cylinder. The term "clearance," while convenient, is actually a misnomer since the existing space between the high points of the lands and the cylinder is so close as scarcely to be measurable. This is advantageous because the greatest temperature exists at the top of the piston where expansion is at the maximum. Here the clearance, such as it is, is uniform so that there is no escape of the compressive forces along the sides of the piston.

There is also the further advantage that this maintenance of a 100 percent physical contact between the high points of the piston lands and the cylinder promotes an outward transfer of heat to and through the walls of the cylinder for radiation into the atmosphere. The oil grooves 133 which are provided recurrently in the body of the piston retain sufficient oil to prevent the piston from seizing. These grooves are desirably spaced about .086" apart, and each may be .010" wide and .005" deep. The cylinder walls are perfectly smooth from end to end, thereby providing for the maximum area of contact with the piston so as to promote a rapid rate of heat transfer therefrom.

In the usual engine a clearance (when cold) exists of from .005" to .010" so that there is a measurable loss of compression and also of heat transferability. In the present engine the clearance, such as it is, need not run more than from .0005" to .0010" (total diameter, when hot), thereby assuring maintenance of perfect concentricity and of 100 per cent circumferential contact between the piston and cylinder. An oil film having a viscosity of 20 or 30 SAE is about .0010" thick, and is suitable for the present engine to effectively enhance the seal between its piston and cylinder. In order that there may be successful operation of an engine having substantially no clearance between the piston and cylinder, as herein described, these parts are produced from like or similar metals having substantially the same coefficient of expansion; in such circumstances the very close clearance herein described may be maintained without difficulty under the usual varying temperature conditions.

In Figs. 13 and 14 I have shown an internal combustion engine having a cylinder C' wherein a piston P' is reciprocably fitted. The associated parts and features, such as the piston rod 135, crank case, shaft, oil grooves, etc., may be conventional. The distinguishing feature of this construction is the provision of an inward taper p' extending for the length of the piston so that at its end which is proximate to the head H' of the cylinder there is a decrease in diameter of perhaps .0010". A corresponding taper is formed on the inner surface c' of the cylinder which defines its combustion chamber. When the piston has advanced for the full distance toward the cylinder head, it is in physical contact with the walls of the cylinder to a plug fit, i. e., substantially 100 percent of its surface area both axially and circumferentially. In response to ignition of the explosive charge, the piston is driven away from the cylinder head, but at the commencement of this stroke, and for a short distance thereafter, its fit within the cylinder is so close that the entire force of the explosion is concentrated on the top of the piston without any opportunity of escape. This makes for a maximum of efficiency so far as concerns application of the explosive force. As the piston movement continues away from the cylinder head, a very slight clearance will open up between itself and the cylinder walls, amounting eventually to perhaps .001" at the conclusion of this stroke. As a result, an oil film will be permitted to enter into the space so cleared and spread therein so as to effectively lubricate the contacting surfaces. The piston may accordingly be characterized as frictionless since adequate provision is made for the presence of an oil film throughout its entire stroke. In such a construction no rings need be used to maintain a close fit for preventing escape of the expanded gases.

A feature of the present two-stroke cycle type of engine is the flat end on the piston which receives the impact of the combustible gases. As a result, the exposed surface area of the piston is reduced to the minimum, permitting maintenance of a completely concentric axial relation with the ignition points of the plug. In consequence, ignition takes place at the center of the combustion chamber which is wholly cylindrical except for the short and shallow lateral extension of the recess $e$. No secondary explosion or detonation will follow the primary explosion which alone produces the power thrust.

Secondary explosions are productive of added heat which is a loss that must be dissipated; they also increase the products of incomplete combustion (CO) which remain to dilute the next explosive charge, thereby causing volumetric inefficiency. A flat piston operating in a combustion chamber that is substantially completely cylindrical, is one of the features of the present engine which contributes to its successful operation. The distance of heat travel to the cylinder walls for dissipation exteriorly thereof is reduced to the minimum, and this factor among others makes it possible to eliminate oil for cooling purposes as is now being done regularly with two-stroke cycle type of engines of the present time. The oil employed with the present engine is utilized for lubrication only and in an amount of only 20 percent or so of that which is commonly used with other comparable engines.

A thin oil is preferred since this vaporizes with the fuel and does not remain in globular form as a vehicle to absorb heat and pass out with the exhaust, thereby to transmit heat therewith to the atmosphere. For best results, the geometric size of the combustion chamber should be kept to a minimum so as to obtain the maximum thrust force from the explosion of the fuel. This follows from the fact that the least amount of area exposed to the flame in a combustion chamber produces the maximum efficiency in operation of the engine. The bore and stroke should desirably be calculated to present the minimum area exposed to the flame for a combustion chamber having a given volume, otherwise some of the energy will be expended in the form of heat with detrimental effects. The stroke is desirably less than the bore so as to reduce the area of the combustion chamber, and the compression ratio may be about 5½ or 6 to 1 for very satisfactory results.

A further important feature of the present engine is the admixture with each explosive charge of a predetermined amount of carbon dioxide ($CO_2$) which results in slowing the burning process and lowering the flame temperature in the combustion chamber, thereby permitting a higher compression ratio without detonation taking place. This carbon dioxide is produced through the substantially complete combustion of the fuel, resulting from proper design of the combustion chamber as hereinbefore described. There is no occasion for any flame to pass out with the exhaust.

In the movement of the combustible fuel toward the intake valve, the Venturi action which takes place in the fuel passageway $b$ promotes vaporization of the fuel whose flow is thereupon accelerated to produce a ramming of the fuel against the underside of the intake valve head 30 where it is halted momentarily to await its release into the combustion chamber. Operation of the poppet valve is controlled by the cam 71, and this is contoured and timed so that the intake valve is open when the piston is approximately 45° short of the bottom dead center. Opening of the exhaust ports starts at about 60° short of the bottom of dead center. For about 15° of the crank shaft movement the exhaust ports are open before the intake valve is also opened.

This 15 percent interval (plus or minus 5°) is critical to the engine operation according to the description herein given. The result is that some of the carbon dioxide from each explosion (perhaps about 12 percent by volume) is retained in the combustion chamber $c$ when the next charge of fresh combustible mixture is admitted thereto. The amount of this carbon dioxide so retained in the combustion chamber depends upon the time interval that the intake valve remains open. If this time be reduced, the carbon dioxide content will be greater, and vice versa. This valve is desirably held open through 90°–95° of the piston travel, but obviously this is a factor to be determined according to the design that is incorporated into the engine. No backfire is possible, because firing is completed before the next charge of fresh fuel mixture is admitted during each cycle of operation.

Reverting now to the friction wheel W of Figs. 3–5, I have there illustrated a tread having certain novel features of improvement. Here it will be noted that the wheel peripheral surface is embossed with a multitude of pyramids having apices $p$ with diamond-shaped bases whose long axes extend parallel with the axis of the wheel, the pyramids being juxtaposed side by side in rows which are aligned with the angularly disposed sides of their bases so as to extend crosswise of each other. As viewed lengthwise of the wheel, i. e., parallelly of its axis, the pyramids that are juxtaposed touch only at their pointed ends. In such an arrangement the apices $p$ of the pyramids are spaced closer to each other in the rows which are aligned with the sides of their bases than they are in the rows which extend parallel with the wheel axis.

A friction wheel having such a construction of tread is pressure-engaged with the tread of the pneumatic tire whose wheel is to be driven. To improve the wear-resistant properties of the frictional surface of the wheel, and also to blunt the points of the pyramidal apices thereon, a plating treatment with chromium or the like is recommended. As shown best in Fig. 4, the wheel tire tread is engaged at a plurality of spaced points crosswise thereof by many pairs of angularly-disposed faces $r$ and $s$ which taper upwardly to provide pyramidal apices that are relatively widely spaced, the distances therebetween being such that at each pressure point the tire tread will be slightly indented, but with freedom on the part of the adjacent tire tread portions, when displaced, to enter into the lines of lower elevation which extend between adjacent rows of pyramids that are aligned with the sides of their diamond-shaped bases. In the succeeding crosswise rows of pyramids the apices thereof are alternately staggered so that the tire-engaging pressure points shift back and forth circumferentially of the tire tread whose higher areas are constantly being displaced into the lower areas of the friction wheel while being concurrently subjected to pressure at closely adjacent points from the angularly-disposed faces $r$ and $s$ adjacent the many apices $p$ which constitute the high points of the friction wheel.

This displacement of the tire tread takes place both internally and externally of the tire, the former when the air therewithin is compressed in response to radial inward displacement of the tread, and the latter when the tread material itself is displaced, mostly in a lateral direction. The provision on the driving wheel W of pyramidal high points specially arranged, as herein specified, produces a high-value frictional engagement on the tire tread of the driven wheel. The tendency to slip is negligible as is also the wear and tear on the tire itself, and I attribute this excellent performance to the contour and arrangement of the high points, i. e., the pyramidal apices $p$, which rise from diamond bases arranged end to end with their long axes parallel of the wheel axis, thus providing between them low points that are aligned with the sides of the bases and crisscrossing each other throughout the peripheral surface of the wheel, the tire tread material being free, when displaced, to move into such low points whereby it is angularly disposed to receive engagement from the similarly angled and inclined faces $r$ and $s$ of the staggered next row of pyramids which are advanced by the wheel into driving position.

I claim:

1. In a two-stroke cycle type of internal combustion engine wherein a flat top piston reciprocates within a combustion chamber formed by the walls of a cylinder having an open top with a closure head affixed thereto and extended laterally thereof, the improvement which comprises the provision at a point laterally of the cylinder of an intake valve having a circular head of the poppet type normally disposed in co-planar relation with the cylinder top, together with a shallow circular recess in the closure head opposite the combustion chamber, and coaxial and coradial therewith, and formed with an extension leading laterally therefrom to a position oppositely of the intake valve head, and of a width substantially equal to the diameter thereof and contoured in conformity therewith to provide therefor a vertical space into which the intake valve head may advance with each reciprocation thereof, there being also in the recess a channel extending from a point centrally thereof to the end of its lateral extension and increasing gradually in width to equal that of the recess itself, and means of ignition disposed within the circular recess of the closure head and coaxially of the cylinder, for firing of a charge of combustible fuel when released through the intake valve into the combustion chamber, the explosive force of each ignited charge of combustible fuel being thereby exerted equally and at like angles upon all coradial points of the piston head to transmit an equalized driving thrust thereto.

2. In a two-stroke cycle type of internal combustion engine wherein a flat top piston reciprocates within a combustion chamber formed by the walls of a cylinder having an open top with a closure head affixed thereto and extended laterally thereof, the improvement which comprises the provision at a point laterally of the cylinder of an intake valve having a circular head of the poppet type normally disposed in coplanar relation with the cylinder top together with a shallow circular recess in the closure head opposite the combustion chamber, and coaxial and coradial therewith, and formed with an extension leading laterally therefrom to a position oppositely of the intake valve head, and of a width substantially equal to the diameter thereof and contoured in conformity therewith to provide therefor a vertical space into which the intake valve head may advance with each reciprocation thereof, there being also in the recess a channel extending from a point centrally thereof to the end of its lateral extension and increasing gradually in width to equal that of the recess itself, the channel roof being bowed upwardly both endwise and crosswise, and means of ignition disposed within the circular recess of the closure head and coaxially of the cylinder, for firing of a charge of combustible fuel when released through the intake valve into the combustion chamber, the explosive force of each ignited charge of combustible fuel being thereby exerted equally and at like angles upon all coradial points of the piston head to transmit an equalized driving thrust thereto.

3. In an internal combustion engine including walls forming a cylinder, a reciprocable piston therein, walls forming a fuel duct adjacent to the cylinder and a movable valve for opening and closing the fuel duct, walls forming a passage of relatively low height extending between said fuel duct and the top of the cylinder and overlying the tops of said valve and piston, said passage being higher over the valve than over the cylinder with the valve end of the passage having a substantially straight side of appreciable height adjacent to the valve end of the fuel passage the straight side being substantially parallel to the valve axis, and the cylinder end of the passage having smoothly rounded sides.

4. The engine of claim 3 wherein said valve end of the passage has its bottom closely adjacent to the edge of the valve for substantially 180° on the side opposite to the cylinder and said cylinder end of the passage has its bottom closely adjacent to the cylinder side walls for more than 180° on the side opposite to the valve, said passage being provided with substantially parallel sides extending between the areas overlying the valve and piston.

5. In an internal combustion engine including walls forming a cylinder, a reciprocable piston therein, walls forming a fuel duct adjacent to the cylinder, a movable valve for opening and closing the fuel duct, walls forming a passage of relatively low height extending between the fuel duct and the top of the cylinder and overlying the tops of the valve and piston and a spark plug opening communicating with said passage at a point adjacent to the cylinder, said passage having a recess in the top wall thereof extending from the portion of the top wall overlying the valve to the spark plug opening for directing fuel from the valve to the area of the passage adjacent to the electrodes of a spark plug in said opening.

6. The engine of claim 5 wherein the valve end of the recess is substantially as wide as the valve head and the spark plug opening end is substantially as wide as said opening and said valve and opening ends are connected by substantially straight sides tapering toward each in the direction of the opening, said recess being arched both longitudinally and laterally.

7. In an internal combustion engine including walls forming a cylinder, a reciprocable piston therein, walls forming a fuel duct adjacent to the cylinder, a movable valve for opening and closing the fuel duct, walls forming a passage of relatively low height extending between the fuel duct and the top of the cylinder and overlying the tops of the valve and piston and a spark plug opening communicating with said passage at a point adjacent to the cylinder, said passage being higher over the valve than over the cylinder with the valve end of the passage having a substantially straight side substantially parallel to the valve axis, said passage having a recess in the top wall thereof extending from the portion of the top wall overlying the valve to the spark plug opening for directing fuel from the valve to the area of the passage adjacent to the electrodes of a spark plug in said opening.

8. The engine of claim 7 wherein said valve end of the passage has its bottom closely adjacent to the edge of the valve for substantially 180° on the side opposite to the cylinder and said cylinder end of the passage has its bottom closely adjacent to the cylinder side walls for more than 180° on the side opposite to the valve, said passage being provided with substantially parallel sides extending between the areas overlying the valve and piston, the valve end of the recess is substantially as wide as the valve head and the spark plug opening end is substantially as wide as said opening and said valve and opening ends are connected by substantially straight sides tapering toward each in the direction of the opening, said recess being arched both longitudinally and laterally.

References Cited in the file of this patent

UNITED STATES PATENTS

| Number | Name | Date |
|---|---|---|
| 289,774 | Korting et al. | Dec. 4, 1883 |
| 931,837 | Beach | Aug. 24, 1909 |
| 974,839 | Spangler | Nov. 8, 1910 |
| 1,379,041 | Pulliam | May 24, 1921 |
| 1,537,775 | Kelly | May 12, 1925 |
| 1,772,103 | Marien | Aug. 5, 1930 |
| 1,772,104 | Marien | Aug. 5, 1930 |
| 1,800,070 | Hewitt | Apr. 7, 1931 |
| 1,956,235 | Hofferberth | Apr. 24, 1934 |
| 2,029,990 | Edlin et al. | Feb. 4, 1936 |
| 2,030,663 | Summers | Feb. 11, 1936 |
| 2,169,120 | Busby | Aug. 8, 1939 |
| 2,173,956 | Roberts | Sept. 26, 1939 |
| 2,350,791 | Mennesson | June 6, 1944 |